United States Patent
Giorgetti et al.

[11] Patent Number: 5,810,123
[45] Date of Patent: Sep. 22, 1998

[54] DISC FOR A VENTILATED DISC BRAKE

[75] Inventors: Alberto Giorgetti, Terno D'Isola; Raffaello Cornolti, Sorisole, both of Italy

[73] Assignee: Freni Brembo S.p.A., Italy

[21] Appl. No.: 525,384

[22] Filed: Sep. 8, 1995

[30]     Foreign Application Priority Data

Oct. 7, 1994 [IT] Italy .................................. MI94A2051

[51] Int. Cl.⁶ ................................................... F16D 65/12
[52] U.S. Cl. ........................... 188/218 XL; 188/264 AA; 192/107 R
[58] Field of Search .............................. 188/71.6, 218 R, 188/218 XL, 264 R, 264 A, 264 AA; 192/70.12, 113.1, 113.2, 113.21, 113.23, 107 R

[56]             References Cited

U.S. PATENT DOCUMENTS

| | | | |
|---|---|---|---|
| 2,757,761 | 8/1956 | Milan | 188/264 A X |
| 3,917,043 | 11/1975 | Bok | 188/218 XL X |
| 4,026,393 | 5/1977 | Gebhardt et al. | 188/218 XL |
| 4,083,435 | 4/1978 | Gallus et al. | 188/218 XL |
| 4,108,286 | 8/1978 | Gagarin | 188/218 XL |
| 4,263,992 | 4/1981 | Moore et al. | 188/218 XL |
| 4,501,346 | 2/1985 | Bogenschutz | 188/218 XL |
| 4,645,041 | 2/1987 | Bass | 188/218 XL |
| 4,811,822 | 3/1989 | Estaque | 188/264 AA X |
| 4,853,574 | 8/1989 | Estaque | 188/264 AA X |
| 4,967,893 | 11/1990 | Vogele | 188/218 XL X |
| 5,107,966 | 4/1992 | Metzler et al. | 188/264 AA X |

FOREIGN PATENT DOCUMENTS

| | | | |
|---|---|---|---|
| 0035468 | 2/1979 | Germany | 188/218 XL |
| 1080035 | 8/1967 | United Kingdom | 188/218 XL |
| 1 421 952 | 1/1976 | United Kingdom | F16D 65/12 |
| WO 94/17316 | 8/1994 | WIPO . | |
| WO 95/00771 | 1/1995 | WIPO . | |

*Primary Examiner*—Josie Ballato
*Attorney, Agent, or Firm*—Sheridan Ross, P.C.

[57]                ABSTRACT

A disc for a ventilated disc brake, particularly for racing cars, which has the advantage of exceptional resistance to both thermal and mechanical stresses, comprising a brake ring and a bell-shape support, in which the brake ring is structurally independent from the bell and is formed from two ring elements separated by an air space and connected by spacer elements, and is attached to the bell by way of the spacer elements.

21 Claims, 2 Drawing Sheets

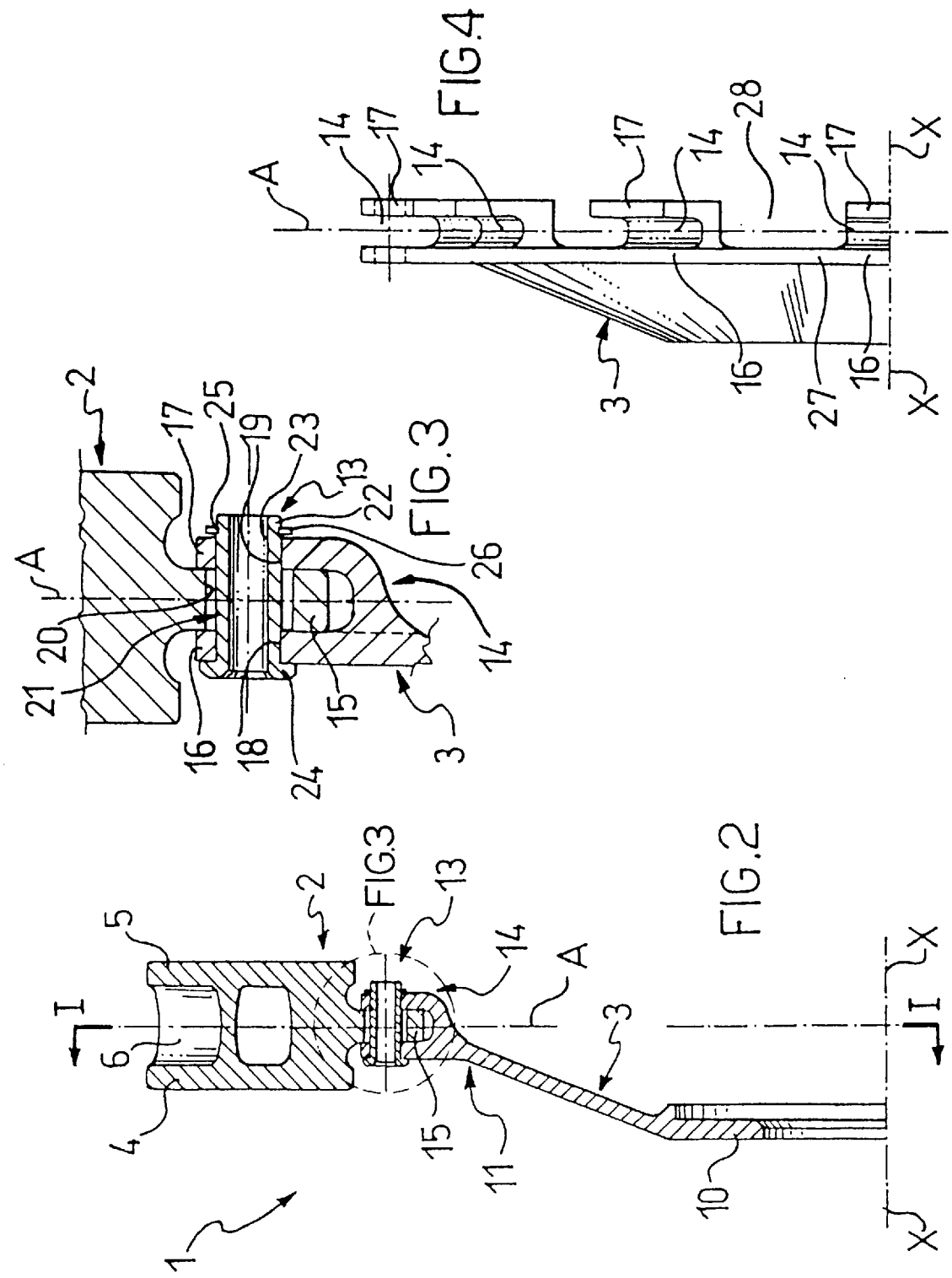

DISC FOR A VENTILATED DISC BRAKE

FIELD OF THE INVENTION

The present invention concerns a disc for a disc brake particularly for racing cars, of the type comprising a brake ring and a bell-shape support, the said brake ring being structurally independent from the bell and formed from two rings which are separated by an air space and connected by spacer elements.

BACKGROUND OF THE INVENTION

Although advantageous in many respects and extensively used the known discs have a recognised disadvantage, which is manifested on prolonged intensive braking.

It is in fact found that the brake ring suffers from non-uniform expansion and deformation and even, in particularly extreme conditions, cracking.

The problem upon which the present invention is based is that of devising a disc for a disc brake of the specified type, with structural and functional characteristics which overcome the aforesaid disadvantage.

SUMMARY OF THE INVENTION

In resolving the aforesaid technical problem, the present invention provides a disc of the specified type which is characterised by the fact that the brake ring is attached to the bell by means of the said spacer elements.

BRIEF DESCRIPTION OF THE DRAWINGS

Further characteristics and the advantages of the disc according to the present invention will become clear from the following description of one possible embodiment, which is indicative and non-limitative, with reference to the accompanying drawings, in which:

FIG. 2 is a sectional view on the line II—II of the disc of FIG. 1;

FIG. 3 is an enlarged sectional view of a detail of the disc of FIG. 2, and

FIG. 4 is a side view of a detail of the disc of FIG. 1.

DETAILED DESCRIPTION OF THE INVENTION

Figure 1:
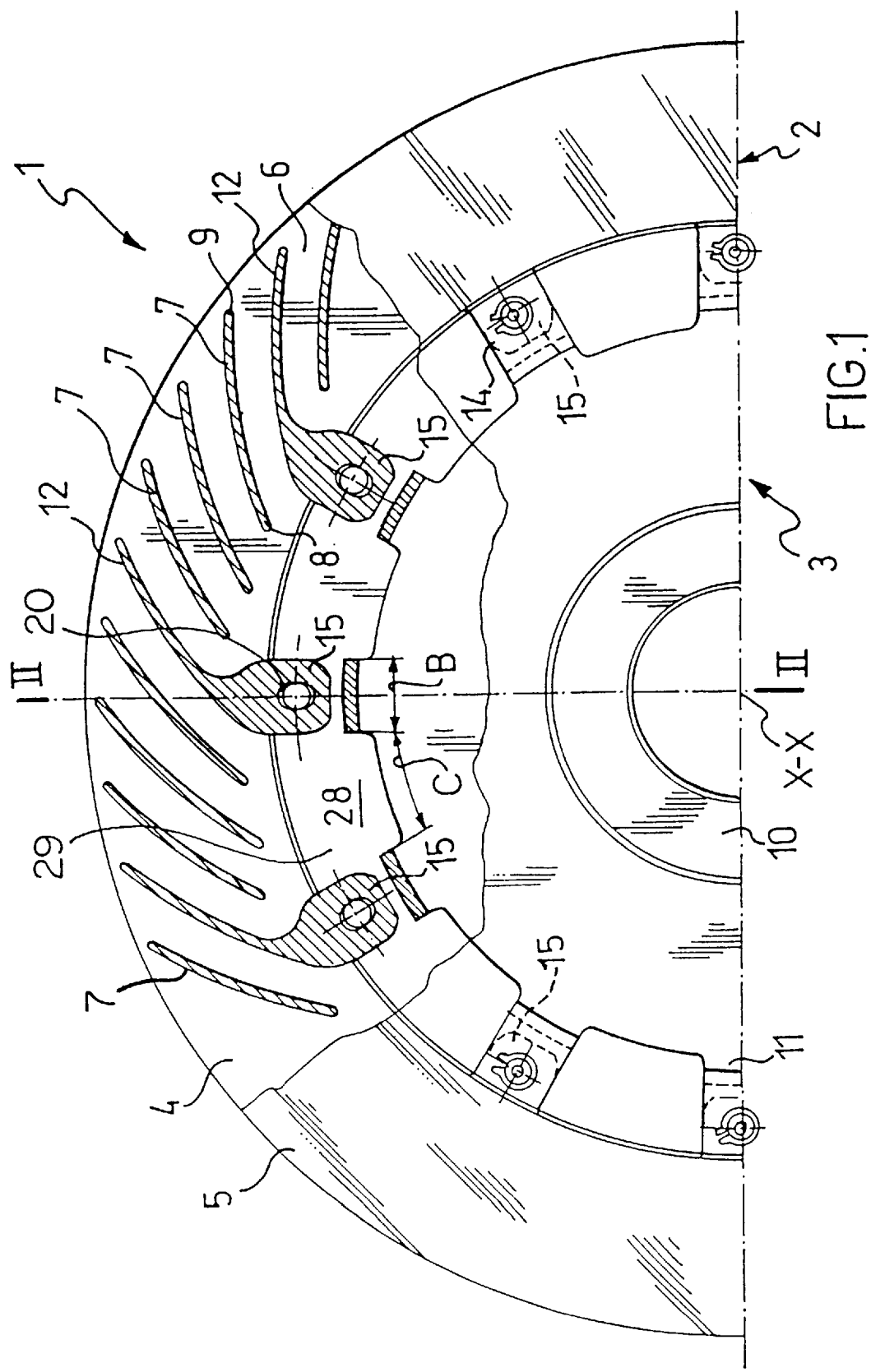
FIG. 1 is a front view, in partial section on the line I—I, of a disc according to the invention.

With reference to the accompanying drawings, 1 indicates in its entirety a disc for a ventilated disc brake, which is particularly suitable for racing cars.

The disc 1 comprises an annular brake ring 2, and a bell-shape support 3, which supports the brake ring 2, both of which are co-axial about a common axis X—X, and structurally independent.

The brake ring 2, conventionally made from an appropriate cast-iron, is made from two rings 4 and 5 with an axis X—X, which are positioned on either side of a plane of symmetry A, and which are separated by air space 6, and connected by spacer elements 7 which extend across the air space 6.

In particular a predetermined number of spacer elements 7 are formed as regularly spaced fins, forty eight in the example, the said fins having a profile extending between leading edge 8 and a trailing edge 9.

The bell 3, conventionally made from an appropriate light alloy, for example an aluminium alloy, comprises an internal flange 10, intended to be fixed to a wheel to be braked, and a periphery 11 which supports brake ring 2.

In the disc 1 according to the present invention the brake ring 2 is releasably attached to the bell 3 by means of a predetermined number of fins 12, of which there are twelve in the example, which are regularly spaced among the forty eight spacer elements 7 and, more particularly, is attached at the leading edges 8 of the said fins 12.

The releasable attachment of the brake ring to the bell is achieved by attachment means, generally indicated with 13.

The attachment means 13 comprises a plurality of forks 14 of which there are twelve in the example, and a plurality of lugs 15 of which there are also twelve in the example. The forks 14 project from the bell around its periphery 11 and have prongs 16 and 17, pierced by coaxial holes 18 and 19 respectively. The lugs 15 project from the leading edges 8 of related fins 12.

It should be noted that each lug 15 lies on the plane of symmetry A, and that the prongs 16 and 17 are disposed symmetrically on either side of the plane of symmetry A.

The lugs 15 are pierced by radially elongated holes 20, and are engaged in the forks 14 and retained in them by connection members 21.

The connection members 21 comprise twelve pins 22, which extend through respective aligned holes 18, 20 and 19.

Each pin 22 is axially traversed by a weight reducing hole 23, and has a head 24 at one end which abuts against the prong 16, and a groove 25 at an opposite end, within which a circlip 26 is releasably lodged which abuts against the prong 17 so as to axially retain the pin.

It should be noted that the prongs 16 are integral with an annular flange 27 formed externally around the periphery 16 of the bell 3, while the prongs 17 are substantially L-shape elements projecting from the said periphery. It should also be noted that the forks 14 and the lugs 15 are regularly spaced, have a pre-determined width B and are separated by spaces respectively indicated with 28 and 29 having a width C which is not less than B.

In use, following braking, the mechanical stresses to which the elements of the brake ring face 2 are exposed, along lines of action disposed symmetrically about the plane of symmetry A, are resisted by the attachment means 13 which is also symmetrical about the plane A, and thus they are resisted without lack of balance or symmetry.

The thermal expansion resulting from the mechanical braking stresses can also freely occur, without distortion or dissymmetry of the entire brake ring which is itself exactly symmetrical with respect to the plane A.

The main advantage of the disc according to the invention lies in its exceptional resistance to mechanical stresses and thermal expansion.

A further advantage of the disc according to the present invention lies in the fact that it allows a simplification of the production process because the brake ring, being symmetrical about the plane A, can be utilised for the brakes on either the left or the right wheels of the vehicle.

A further advantage of the disc according to the present invention lies in its simple construction and its lightness.

The person skilled in the art is obviously able to introduce numerous modifications and variants to the disc as described above in order to satisfy contingent and specific requirements, all of which remain within the scope of protection of the invention as defined in the following claims.

We claim:

1. A disc for a disc brake of the type comprising a brake ring and a bell-shape support separate from said brake ring, the brake ring being composed of a first material different from a second material contained in said bell-shape support, the first and second materials having different coefficients of thermal expansion, said brake ring being formed from at least two ring elements separated by an air space and connected by spacer elements, wherein said brake ring is attached to said bell-shape support by means of said spacer elements, wherein each of said spacer elements has at least one lug that is received between at least one fork projecting from said bell-shape support and each said lug is removably retained in said each fork by at least one connection member, whereby said brake ring and bell-shape support are substantially free to thermally expand and contract.

2. A disc according to claim 1, further comprising a plurality of said forks projecting from said bell-shape support and a plurality of said lugs projecting from said spacer elements engaged in said forks and retained therein by a plurality of connection members.

3. A disc according to claim 2, wherein said spacer elements are fins and said lugs project as extensions of said fins from a leading edge of said fins.

4. A disc according to claim 3, wherein said connection members comprise hollow pins which extend through holes formed in said forks and holes formed in said lugs.

5. A disc according to claim 4, wherein said holes formed in said lugs are radially elongated.

6. The disc brake according to claim 3, wherein said brake ring has a center and a length of each of said fins is inclined relative to a radial line extending from the center to a point on a peripheral edge of the brake ring.

7. The disc according to claim 1, wherein said disc has a plurality of said forks and wherein the bell-shape support includes a peripheral edge extending between said forks, said forks being spaced at intervals around the circumference of the bell-shape support, and at least one of said forks is defined by a first prong that is coplanar with the peripheral edge of the bell-shape support and a second prong comprising a substantially L-shaped element projecting from a periphery of said bell-shape support.

8. A disc brake according to claim 7, wherein said forks comprise a first prong integral with said peripheral edge of said bell-shape support and a second prong comprising a substantially L-shaped element projecting from a periphery of said bell-shape support.

9. The disc according to claim 1, wherein said bell-shape support comprises a plurality of said forks spaced at selected intervals about a peripheral edge of said bell-shape support and said brake ring comprises a plurality of said lugs spaced at said selected intervals about an inner edge of said brake ring, and wherein each of said lugs has a width that is no less than a distance between a pair of forks that are adjacent to each said lug, whereby each of said lugs are able to be engaged with respective forks.

10. In a disc for a disc brake of the type comprising a brake ring and a separate bell-shape support, the brake ring being formed from two ring elements each of said ring elements having braking surfaces lying in substantially parallel planes and separated by an air space and connected by spacer elements including a plurality of lugs projecting from said spacer elements for releasably engaging the bell-shape support.

11. The brake ring according to claim 10, wherein said brake ring has a center and a length of fins being inclined relative to a radial line extending from the center to a point on a peripheral edge of the brake ring.

12. The brake ring according to claim 11, wherein each of said fins has a leading edge and each of the lugs is on the leading edge of each of said fins.

13. The brake ring according to claim 12, wherein each of said lugs includes a radially elongated hole for receiving a connection member.

14. In a disc for a disc brake of the type comprising a brake ring and a separate bell-shape support, the bell-shape support comprising a plurality of spaced apart forks projecting from a periphery thereof, each of said forks comprising at least two prongs each of which is pierced by a hole, said holes being coaxially aligned relative to one another and adapted to be aligned with a corresponding hole of a lug of said brake ring, said lug being engaged in said prongs and retained therein by connection members received within said coaxial holes of said corresponding fork and said corresponding hole of said lug, said connection members comprising pins extending along said holes, to retain said lug in the fork corresponding to said lug.

15. A bell-shape support for a disc of a disc brake as recited in claim 14, wherein said forks comprise a first prong integral with said periphery of said bell-shape support and a second prong comprising a substantially L-shaped element projecting from said periphery of said bell-shape support.

16. A disc for a disc brake, comprising:

a brake ring formed from at least two ring elements that are symmetrical about an axis of symmetry, each of said ring elements having braking surfaces defining substantially parallel planes and connected by spacer elements including a plurality of lugs projecting from said spacer elements, each of said lugs including a hole;

a bell-shape support having a peripheral edge for attaching the disc to an axle comprising a plurality of spaced-apart forks projecting from said peripheral edge of the bell-shape support, each of the forks releasably engaging a corresponding lug and each of said forks including a hole coaxially aligned with respect to one another; and a plurality of connection members for releasably attaching the lugs to the forks, each connection member being received in the holes in said forks, wherein the bell-shape support and the brake ring have different coefficients of thermal expansion and are substantially free to thermally expand and contract.

17. A disc according to claim 16, wherein said spacer elements are fins and said lugs project as extensions of said fins from a leading edge of said fins.

18. A disc according to claim 16, wherein said connection members comprise pins which extend through the holes formed in said forks and the holes formed in said lugs, the pins being symmetrically disposed relative to the axis of symmetry to resist mechanical stresses from braking while maintaining the disc in balance.

19. A disc according to claim 16, wherein said holes formed in said lugs are radially elongated.

20. The disc according to claim 16, wherein at least one of the forks is defined by a first prong that is coplanar with the peripheral edge of the bell-shape support and a second prong comprising a substantially L-shaped element projecting from the periphery of said bell-shape support.

21. The disc according to claim 16, wherein the forks have prongs that are symmetrically disposed relative to the axis of symmetry.

* * * * *